(12) United States Patent
Pomorin et al.

(10) Patent No.: US 11,001,737 B2
(45) Date of Patent: May 11, 2021

(54) PERMEATION-INHIBITING RELEASE COATING

(71) Applicant: Evonik Operations GmbH, Essen (DE)

(72) Inventors: Juergen Pomorin, Essen (DE); Dieter Grauer, Remseck (DE); Hardi Doehler, Essen (DE); Ingo Schoenemann, Muelheim an der Ruhr (DE); Mike Brand, Essen (DE)

(73) Assignee: Evonik Operations GmbH, Essen (DE)

( * ) Notice: Subject to any disclaimer, the term of this patent is extended or adjusted under 35 U.S.C. 154(b) by 157 days.

(21) Appl. No.: 16/312,330

(22) PCT Filed: Jun. 7, 2017

(86) PCT No.: PCT/EP2017/063786
§ 371 (c)(1),
(2) Date: Dec. 21, 2018

(87) PCT Pub. No.: WO2018/001687
PCT Pub. Date: Jan. 4, 2018

(65) Prior Publication Data
US 2019/0161656 A1  May 30, 2019

(30) Foreign Application Priority Data

Jun. 27, 2016 (EP) .................................. 16176339

(51) Int. Cl.
| | | |
|---|---|---|
| *C09D 183/10* | (2006.01) | |
| *C08F 222/10* | (2006.01) | |
| *C08F 283/12* | (2006.01) | |
| *C09J 183/10* | (2006.01) | |
| *C08G 77/442* | (2006.01) | |
| *B32B 27/10* | (2006.01) | |
| *B32B 27/28* | (2006.01) | |
| *D21H 19/32* | (2006.01) | |
| *C08G 77/20* | (2006.01) | |

(52) U.S. Cl.
CPC ............ *C09J 183/10* (2013.01); *B32B 27/10* (2013.01); *B32B 27/283* (2013.01); *C08F 283/124* (2013.01); *C08G 77/442* (2013.01); *C09D 183/10* (2013.01); *D21H 19/32* (2013.01); *B32B 2307/7265* (2013.01); *B32B 2383/00* (2013.01); *B32B 2405/00* (2013.01); *B32B 2554/00* (2013.01); *C08G 77/20* (2013.01); *C09J 2483/005* (2013.01)

(58) Field of Classification Search
CPC .... C09J 183/10; C08G 77/442; C09D 183/10; C09D 143/04; C09D 133/066; C09D 133/08; C08F 283/12; C08F 283/124; C08F 222/1025
See application file for complete search history.

(56) References Cited

U.S. PATENT DOCUMENTS

| | | | | |
|---|---|---|---|---|
| 7,462,650 | B2 * | 12/2008 | Sommerlade | ........... C07C 45/46 522/36 |
| 7,723,397 | B2 * | 5/2010 | Husler | .................... G03F 7/031 522/36 |
| 9,693,043 | B2 * | 6/2017 | Lin | ........................ B41M 3/003 |
| 10,465,032 | B2 * | 11/2019 | Doehler | .............. C08F 283/128 |

FOREIGN PATENT DOCUMENTS

| | | | | |
|---|---|---|---|---|
| CN | 1508204 A | | 6/2004 | |
| CN | 103937377 A | * | 7/2014 | ........... C09D 163/10 |
| WO | WO 2016/096595 A1 | | 6/2016 | |

OTHER PUBLICATIONS

International Search Report dated Jun. 30, 2017 in PCT/EP2017/063786 filed on Jun. 7, 2017.
European Search Report dated Oct. 6, 2016 in European Application 16176339.6 filed on Jun. 27, 2016.
Combined Taiwanese Office Action and Search Report dated Nov. 30, 2020 in Taiwanese Patent Application No. 106120935 (with English translation of Category of Cited Documents), 8 pages.

* cited by examiner

*Primary Examiner* — Rip A Lee
(74) *Attorney, Agent, or Firm* — Oblon, McClelland, Maier & Neustadt, L.L.P.

(57) ABSTRACT

The invention relates to compositions containing at least one siloxane which comprises ethylenically unsaturated, radically polymerizing groups, and at least one hydrocarbon with ethylenically unsaturated, radically polymerizing groups, which have, when used as a separating coating, an improved barrier effect.

14 Claims, No Drawings

PERMEATION-INHIBITING RELEASE COATING

This invention relates to compositions comprising at least one siloxane which has ethylenically unsaturated free-radically polymerizable groups, and also comprising at least one hydrocarbon having ethylenically unsaturated free-radically polymerizable groups, which have an improved barrier effect when used as release coatings.

Polysiloxanes which comprise (meth)acrylate ester groups are established as binders curable under high-energy radiation, for example as coating materials for surfaces of plastic and of paper. The curing is accomplished in particular through UV radiation (following addition of known photoinitiators) or by electron beams. (Meth)acrylate-modified organosiloxanes are described in numerous patent specifications, as for example in U.S. Pat. Nos. 6,211,322 and 4,978,726.

(Meth)acrylate-modified organosiloxanes can be crosslinked three-dimensionally by free radicals and cure thermally with addition of peroxides, for example, or under the effect of high-energy radiation, such as UV radiation or electron beams, within a very short time to form coats which possess mechanical and chemical resistance. Where UV light is used as a radiation source, the crosslinking takes place preferably in the presence of photoinitiators and/or photosensitizers, such as benzophenone and its derivatives, benzoin derivatives, alpha-hydroxyalkylphenones and derivatives, and also acylphosphine oxide and derivatives. Customary photoinitiators are described in "A Compilation of Photoinitiators Commercially available for UV today" (K. Dietliker, SITA Technology Ltd., London 2002).

Unbranched polysiloxanes may be modified at the two terminal siloxydimethyl units or at one or more siloxymethyl units within the siloxane chain. Accordingly, the polysiloxanes are referred to as terminally or laterally modified. The modification can also be both terminal and lateral.

To prepare release coatings, individual or mixtures of the aforementioned siloxane compounds may be applied to sheet-like carriers and be crosslinked. Sheet-like carriers can be, for example, papers, plastic films based on mineral oil and based on renewable raw materials, woven fabrics, metal foils and be provided either smooth or with superficial structures. Release coatings are used, for example, in adhesive tapes, labels, packaging for self-adhesive hygiene products or covers for bitumen roofing membranes. Release coatings have a good release effect towards the adhesive compositions used in these applications. By means of direct contact of the release coating with the adhesive compositions, the danger exists of the permeation of constituents able to migrate from the adhesive compositions through the release layer.

This can lead to undesired effects, as explained in the following examples.

A bitumen roofing membrane has a bitumen layer on a support material as adhesive composition. To cover the bitumen material, a silicone-coated olefin-based release film is often used. In the laminate, constituents that can migrate can migrate from the bitumen material through the silicone release layer and further into the olefinic film which can thereby become highly discoloured and can alter in terms of its strength.

An individually packaged sanitary towel which has a very soft hot melt adhesive on the sanitary towel as adhesive material. To cover the adhesive material, an olefin-based silicone-coated release film is often used which at the same time is the outer packaging of the sanitary towel. In the laminate, constituents that can migrate can migrate from the adhesive material through the silicone release layer and further through the olefinic film and therefore accumulate on the outer side of the outer packaging. The outer packagings can thus adhere to each other which is undesirable.

A thermal label designed as an adhesive tape and consisting of a white paper with a thermally activatable colour layer has for example a hot melt adhesive as adhesive composition. In order that the paper with the hot melt adhesive as adhesive tape can be wound around itself and can be wound again, the upper side of the white paper is equipped with a silicone release layer. In the adhesive tape, constituents that can migrate can migrate from the adhesive material through the silicone release layer and further into the white paper and thus the activatable colour layer. These constituents can over time partly activate the colour layer even without thermal activation and thus lead to a greying of the white paper.

In many cases, in order to prevent the undesired effects of constituents that can migrate from the adhesive composition, a barrier layer against constituents that can migrate is applied at a suitable point. For example, this can be a coextrusion layer with a barrier effect within the olefinic film or a barrier coating on the sheet-like carrier below the silicone release layer. In the case of the thermal label designed as adhesive tape, a topcoat is typically applied to the white paper which has this barrier effect. By applying a barrier layer, the price of the thermal paper for example increases such that it is desirable that the silicone release layer can assume this task.

EP2279877 discloses protective layers against water, oil and plasticizers which consist of at least 60% by weight diacetone-modified polyvinyl alcohol and further ethylene vinyl alcohol copolymers, which have been incorporated into a heat-sensitive recording layer. As further additive as lubricating material and release agent, polyethylene oxide, inter alia, is proposed.

The thermal layer in thermal papers without topcoat may be activated also under the influence of organic solvents, oils and, for example, hand creams and thus undesired discolouration can occur. With the widely used organic solvents ethanol, isopropanol, butyl acetate and methyl isobutyl ketone, activation of the thermal layer can be observed after a few seconds of contact time. The effectiveness of a barrier layer or the barrier effect of a release coating can be evaluated by a standardized test with such solvents. If the white paper surface remains without greying even after a fixed exposure time, the thermal layer is not activated and therefore a barrier effect is present. In this case, a partial activation of the thermal layer, i.e. a slight greying, is still acceptable.

Pure silicone coatings have a very inadequate barrier effect. Due to this property, silicone coatings may be used particularly well, for example, as membrane coatings for molecular filtration, as described in WO 2011/067054.

The barrier effect of a silicone release layer is dependent on the degree of crosslinking, i.e. the density of the polymer network. In the case of (meth)acrylate-modified organosiloxanes, a high network density and therefore improved barrier effect may be achieved by means of a relatively high modification density using polar and/or reactive groups. Release coatings with such properties have an increased release force however. The release force of such siloxanes for adhesive compositions is unsatisfactorily increased and the barrier effect accordingly still insufficient.

The relationship between organomodification, degree of acrylation and release behaviour has been described, for example, by Hardi Döhler in "RC Silicones for the next Millenium" in Pressure Sensitive Industry: Markets and Technology Yearbook: 1999; Data Transcripts, Surrey, U. K., 1999 and is also subject matter of PCT/EP2015/079237. A good barrier effect with at the same time a good release force is therefore not satisfactorily achievable with (meth) acrylate-modified organosiloxanes alone. PCT/EP2015/079237 describes mixtures of (meth)acrylate-modified organopolysiloxanes and organic acrylates comprising oxyethylene groups. By means of oxyethylene groups in the organic acrylate, a clearer separation of the silicone component is established whereby the release behaviour of the silicone component is less impaired than the barrier properties.

As well as the (meth)acrylate-modified organopolysiloxanes described, radiation-curing coatings on a purely organic basis are known, and are described in, for example, European Coatings Tech Files; Patrick Glöckner et al. "Radiation Curing Coatings and printing inks", 2008, Vincentz Network, Hanover, Germany. Such purely organic coating compositions have, depending on type, a high cross-linking density and therefore a better barrier effect. However, these purely organic coating compositions have a very unsatisfactory release behaviour compared to adhesive compositions.

Therefore, the object of the invention was to provide release coatings having a barrier effect with respect to constituents of, for example, adhesive layers that can migrate.

Surprisingly, it has been found that compositions comprising at least one siloxane which has ethylenically unsaturated free-radically polymerizable groups, and also comprising at least one hydrocarbon having ethylenically unsaturated free-radically polymerizable groups, as described in the claims, achieve this object.

The present invention therefore provides permeation-inhibiting release coatings obtainable by curing a composition comprising components (I), (II) and optionally (III)

(I) 10 to 90% by weight, based on the sum total of components (I), (II) and (III) of the composition, comprises silicon-free hydrocarbons which consist of the elements carbon, hydrogen and oxygen and which have at least one ethylenically unsaturated free-radically polymerizable group and have no oxyethylene groups,
wherein component (I) has a hydrocarbon to an extent of at least 80 up to 100% by weight, based on the total mass of component (I), having two or more ethylenically unsaturated free-radically polymerizable groups and at least one aromatic group;

(II) 10 to 90% by weight, based on the sum total of components (I), (II) and (III) of the composition, of one or more organomodified silicones having 50 to 500, preferably 60 to 300, more preferably 70 to 200, especially preferably 80 to 180 silicon atoms, it being possible for 0.4 o 10%, preferably 0.6 to 8% and preferably 0.8 to 7% of the silicon atoms to bear ethylenically unsaturated free-radically polymerizable groups, and it being possible for one silicon atom to bear one, two or three such groups, (III) 0 to 70% by weight, based on the sum total of components (I), (II) and (III) of the composition, of one or more organomodified silicones having 4 to 40, preferably 10 to 30, silicon atoms, wherein 15 to 100%, preferably 20 to 50% of the silicon atoms have ethylenically unsaturated free-radically polymerizable groups, and optionally further additives,
wherein the release coating has a permeation barrier against butyl acetate, wherein the permeation barrier is determined as described in the description and the delta-L* value determined thereby is from 1 to 20.

The present invention further relates to the use of the permeation-inhibiting release coatings obtainable by curing a composition comprising components (I), (II) and optionally (III)

(I) 20 to 90% by weight, based on the sum total of components (I), (II) and (III) of the composition, comprises silicon-free hydrocarbons which consist of the elements carbon, hydrogen and oxygen and which have at least one ethylenically unsaturated free-radically polymerizable group and have no oxyethylene groups,
wherein component (I) has a hydrocarbon to an extent of at least 80 up to 100% by weight, based on the total mass of component (I), having two or more ethylenically unsaturated free-radically polymerizable groups and at least one aromatic group;

(II) 10 to 90% by weight, based on the sum total of components (I), (II) and (III) of the composition, of one or more organomodified silicones having 50 to 500 silicon atoms, it being possible for 0.4 to 10% of the silicon atoms to bear ethylenically unsaturated free-radically polymerizable groups, and it being possible for one silicon atom to bear one, two or three such groups;

(III) 0 to 70% by weight, based on the sum total of components (I), (II) and (III) of the composition, of one or more organomodified silicones having 4 to 40 silicon atoms, wherein 15 to 100% of the silicon atoms have ethylenically unsaturated free-radically polymerizable groups;
and optionally further additives;
wherein the release coating has a permeation barrier against butyl acetate, wherein the permeation barrier is determined as described in the description and the delta-12* value determined thereby is from 1 to 20 as topcoat for thermal papers.

The present invention further relates to a method for preparing the permeation-inhibiting release coatings according to the invention.

The present invention further relates to a radiation-curing coating composition for preparing the release coatings according to the invention having a permeation barrier against butyl acetate, comprising components (I), (II) and (III) as described above.

The permeation-inhibiting release coatings according to the invention of heat-sensitive papers are advantageous, in which the heat-sensitive layer has to be protected prior to contact with substances that can migrate such as solvents, waxes, oils, fats, and also constituents of adhesives, since the heat-sensitive layer otherwise discolours.

The permeation-inhibiting release coatings according to the invention are likewise advantageous since they have good release forces with respect to adhesive layers.

The permeation-inhibiting release coatings according to the invention are particularly advantageous since a separate release film to protect the adhesive layer is saved and thus, for example, thermal papers as adhesive tape are feasible.

The subject matter of the invention will be described by way of example below, without the invention being intended to be restricted to these illustrative embodiments. When ranges, general formulae or classes of compounds are specified below, these are intended to encompass not only the corresponding ranges or groups of compounds which are explicitly mentioned but also all subranges and subgroups of compounds which can be derived by leaving out individual values (ranges) or compounds. When documents are cited in the context of the present description, the contents thereof, particularly with regard to the subject matter that forms the context in which the document has been cited, are considered in their entirety to form part of the disclosure content of the present invention. Unless stated otherwise, percentages are figures in percent by weight. When average values are reported below, the values in question are weight averages, unless stated otherwise. When parameters which have been determined by measurement are reported below, the measurements have been carried out at a temperature of 25° C. and a pressure of 101 325 Pa, unless stated otherwise.

The compounds of components (I), (II) and (III) can be statistically structured. Statistical distributions are of blockwise construction with any desired number of blocks and with any desired sequence or are subject to a randomized distribution; they may also have an alternating construction or else form a gradient over the chain; more particularly they can also form any mixed forms in which groups with different distributions may optionally follow one another. The nature of specific embodiments can result in restrictions to the statistical distributions. In all regions unaffected by the restriction there is no change to the statistical distribution.

The indices reproduced in the formulae (I) and (II) given here, and the ranges of values for the indices stated, should be understood as the average values of the possible statistical distribution of the structures and/or mixtures thereof that are actually present. This also applies to structural formulae exactly reproduced per se as such.

The permeation barrier of the release coatings according to the invention is determined against butyl acetate. For this purpose, a thermal paper having a heat-sensitive layer without a protecting coating (topcoat) is provided with the permeation-inhibiting release coating according to the invention on this heat-sensitive layer, as described in the examples. The thermal paper with cured permeation-inhibiting release coating (test paper) at 25° C. and a relative air humidity of 40% is provided with an amount of 0.5 ml of butyl acetate as described in the examples. After 20 seconds, the drop is removed as far as possible without pressure by soaking up with absorbent paper and, after ventilating at room temperature in the hood, the effect on the heat-sensitive layer is assessed after 30 minutes. For this purpose, an SP62 spectrophotometer from X-Rite, Michigan, is used, as described in the examples. With the spectrophotometer, L* values prior to treatment with butyl acetate (blank value) and alter treatment with butyl acetate are determined and the difference delta-L* used for the evaluation.

The release coatings according to the invention preferably have a permeation barrier expressed in the form of the delta-L* values. The release coatings according to the invention more preferably have a permeation barrier, the delta-L* values of which are from 1 to 20, particularly preferably the delta-L* values of which are from 1 to 18 and especially preferably the delta-L* values of which are from 2 to 15.

The permeation-inhibiting release coatings according to the invention preferably have release forces of at most 80 cN/2.5 cm, more preferably of at most 50 cN/2.5 cm, more preferably of at most 30 cN/2.5 cm, wherein the lower value is greater than 1 cN/2.5 cm, preferably greater than 3 cN/2.5 cm, wherein the release force is determined in accordance with FINAT Handbook 8th Edition, The Hague/NI, 2009 under the designation FTM 10.

The release coatings according to the invention more preferably have a permeation barrier with a delta-L* value of 1 to 18 and a release force of 1 cN/2.5 to 50 cN/2.5 cm, more preferably a delta-L* value of 2 to 15 and a release force of 3 cN/2.5 to 30 cN/2.5 cm. Component (I) is preferably free of silicon atoms.

Component (I) is preferably free of silicon atoms and preferably the hydrocarbon of component (I) has two or more ethylenically unsaturated free-radically polymerizable groups. More preferably, the hydrocarbon has two or more ethylenically unsaturated free-radically polymerizable groups and at least one aromatic group or the hydrocarbon has three or more ethylenically unsaturated free-radically polymerizable groups or a mixture of the two hydrocarbons. Even more preferably, the hydrocarbon has two acrylic or methacrylic acid groups and at least one aromatic group or the hydrocarbon has three or more ethylenically unsaturated free-radically polymerizable groups or more preferably a mixture of the two hydrocarbons.

The compositions according to the invention preferably have no components which are free of silicon atoms and which have both oxyethylene groups and ethylenically unsaturated free-radically polymerizable groups.

With further preference, the hydrocarbons of components (I), (II) and (III) have groups, as ethylenically unsaturated free-radically polymerizable groups, that are selected from acrylic and/or methacrylic ester functions, more preferably acrylic ester functions.

The composition preferably comprises component (I) at 20 to 70% by weight, more preferably 30 to 60% by weight, based on the sum total of components (I), (II) and (III).

The composition preferably comprises component (II) at 30 to 80% by weight and particularly preferably 40 to 70% by weight, based on the sum total of components (I), (II) and (III) of the composition.

The composition preferably comprises component (III) at 0 to 40% by weight, based on the sum total of components (I), (II) and (III) of the composition.

Preferred components (II) and/or (III) are those which as well as the ethylenically unsaturated free-radically polymerizable groups also comprise groups that are as yet not free-radically polymerizable. The ester groups that are not free-radically polymerizable are preferably selected from the acid radicals of the acids acetic acid, propionic acid, butyric acid, valeric acid and benzoic acid, more preferably acetic acid.

More preferably, the ester groups that are not free-radically polymerizable groups are acetic acid and the ethylenically unsaturated free-radically polymerizable groups are acrylic and/or methacrylic ester functions.

The ester groups that are not free-radically polymerizable are further preferably present in component (III) in a numerical proportion preferably of 3 to 20%, more preferably 5 to 15%, based on the number of all ester functions in component (III).

The ester groups that are not free-radically polymerizable are further preferably present in component (II) in a numerical proportion preferably of 0 to 20%, more preferably of greater than 0 to 15%, and more preferably still not at all.

More preferably, the composition has no ester groups that are not free-radically polymerizable in component (II), and in component (III) has a numerical proportion of 5 to 15%, based on the number of all ester functions in component (III), of ester groups that are not free-radically polymerizable.

More preferably, the composition comprises component (III) in a percentage of 0 to 50% by weight, based on the sum total of components (I), (II) and (III) of the comparison, having 4 to 40 silicon atoms, with 15 to 100% of the silicon atoms comprising ethylenically unsaturated free-radically polymerizable groups, preferably acrylic and/or methacrylic ester functions.

Particularly preferably, the composition comprises component (III) in a percentage of 0 to 50% by weight, based on the sum total of components (I), (II) and (III) of the compositions, having 4 to 40 silicon atoms, with 15 to 100% of the silicon atoms comprising ethylenically unsaturated free-radically polymerizable groups, preferably acrylic and/or methacrylic ester functions, which as well as the ethylenically unsaturated free-radically polymerizable groups also comprise ester groups which are as yet not polymerizable, in a numerical proportion of 3 to 20%, based on the number of all ester functions.

The composition preferably comprises component (III) in a percentage of 0 to 40%, based on the sum total of components (I), (II) and (III) of the composition, having 10 to 30 silicon atoms, with 20 to 50% of the silicon atoms comprising ethylenically unsaturated free-radically polymerizable groups, preferably acrylic ester functions, which as well as the ethylenically unsaturated free-radically polymerizable groups also comprise ester groups which are as yet not polymerizable, in a numerical proportion of 5 to 15%, based on the number of all ester functions.

The statement that a particular percentage of the silicon atoms of components (II) and/or (III) is substituted in a particular way pertains to the molar fraction of all silicon atoms in the numerical statistical average of all molecules in the component in question.

With further preference, the components (II) are one or more compounds of the formula (I), $$M^1_a M^2_b D^1_c D^2_d \qquad (I)$$

with
$M^1=[R^1_3 SiO_{1/2}]$,
$M^2=[R^1_2 R^2 SiO_{1/2}]$,
$D^1=[R^1_2 SiO_{2/2}]$,
$D^2=[R^1 R^2 SiO_{2/2}]$,
a=0 to 2,
b=0 to 2, and a+b=2,
c=50 to 490, preferably 60 to 290, more preferably 70 to 190, especially preferably 80 to 170,
d=0 to 15, preferably 0 to 10,
and the ratio of the sum (b+d) to the sum (c+d+2) is from 0.004 up to 0.1, preferably 0.006 to 0.8, and more preferably 0.008 to 0.7;
and the sum (c+d+2) is 50 to 500, preferably 60 to 300, more preferably 70 to 200, especially preferably 80 to 180,
$R^1$ denotes identical or different aliphatic hydrocarbons having 1 to 10 carbon atoms or aromatic hydrocarbons having 6 to 12 carbon atoms, preferably methyl and/or phenyl groups, especially preferably methyl groups,
$R^2$ denotes identical or different hydrocarbons which have 1 to 5 identical or different ester functions, the hydrocarbon being linear, cyclic, branched and/or aromatic, preferably linear or branched, and the ester functions being selected from ethylenically unsaturated free-radically polymerizable ester functions and from ester groups that are not free-radically polymerizable.

The ethylenically unsaturated free-radically polymerizable ester functions of radicals $R^2$ in compounds of the formula (I) are preferably those selected from acrylic and/or methacrylic ester functions, more preferably acrylic ester functions.

The ester groups that are not free-radically polymerizable of the radicals $R^2$ in compounds of the formula (I) are preferably monocarboxylic acid radicals. The ester groups that are not free-radically polymerizable are preferably selected from the acid radicals of the acids acetic acid, propionic acid, butyric acid, valeric acid and benzoic acid, more preferably acetic acid. More preferably, the monocarboxylic acid radicals are present in a numerical proportion of 0 to 20%, preferably greater than 0 to 15%, based on the number of all ester functions of the compounds of the formula (II).

The radicals $R^2$ in compounds of the formula (I) preferably have no ester groups that are not free-radically polymerizable.

With further preference, the components (III) are one or more compounds of the formula (II), $$M^1_e M^3_f D^1_g D^3_h \qquad (II)$$

with
$M^1=[R^1_3 SiO_{1/2}]$,
$M^3=[R^1_2 R^3 SiO_{1/2}]$,
$D^1=[R^1_2 SiO_{2/2}]$,
$D^3=[R^1 R^3 SiO_{2/2}]$,
e=0 to 2,
f=0 to 2, preferably zero, and e+f=2,
g=0 to 38, preferably 10 to 26,
h=0 to 20, preferably 4 to 15,
and the ratio of the sum (f+h) to the sum (g+h+2) is from 0.15 up to 1, preferably 0.2 to 0.5, and the sum (g+h+2) is 4 to 40, preferably 10 to 30, and the radicals $R^1$ are defined as specified for formula (I),
$R^3$ denotes identical or different hydrocarbons which have 1 to 5 identical or different ester functions, the hydrocarbon being linear, cyclic, branched and/or aromatic, preferably linear or branched, and the ester functions being selected from ethylenically unsaturated free-radically polymerizable ester functions and from ester groups that are not free-radically polymerizable.

The ethylenically unsaturated free-radically polymerizable ester functions of radicals $R^3$ in compounds of the formula (II) are preferably those selected from acrylic and/or methacrylic ester functions, more preferably acrylic ester functions.

The ester groups that are not free-radically polymerizable of the radicals $R^3$ in compounds of the formula (II) are preferably monocarboxylic acid radicals. The ester groups that are not free-radically polymerizable are preferably selected from the acid radicals of the acids acetic acid, propionic acid, butyric acid, valeric acid and benzoic acid, more preferably acetic acid. More preferably, the monocarboxylic acid radicals are present in a numerical proportion of 3 to 20%, preferably 5 to 15%, based on the number of all ester functions of the compounds of the formula (II).

With particular preference, the composition does not comprise component (III).

The permeation-inhibiting release coating is preferably a radiation-curing coating composition. The release coating is more preferably an adhesive coating.

The release effect with respect to adhesive materials, in industrial application usually adhesive tapes or labels, is expressed by the release force, with a low release force describing a good release effect. This test is carried out in accordance with FINAT Handbook, 8th Edition, The Hague/NL, 2009 under designation FTM 10, with the modification that the storage is carried out at 40° C. under pressure, as described in the examples. The release force depends on the quality of the release coating (e.g. uniformity, thickness and/or smoothness of the coating), on the adhesive and on the test conditions. For evaluation of release coatings, therefore, identical adhesives and test conditions ought to be present. To determine the release forces, the adhesive tape TESA®7475, trademark of tesa SE, Germany, Hamburg was used at a width of 2.5 cm.

The permeation-inhibiting release coatings according to the invention preferably have release forces of at most 80 cN/2.5 cm, more preferably at most 50 cN/2.5 cm, more preferably at most 30 cN/2.5 cm, wherein the lower value is greater than 1 cN/2.5 cm, preferably greater than 3 cN/2.5 cm.

The additives are preferably selected from photoinitiators, photosensitizers, fillers, pigments, solvents, phosphorus-containing compounds which polymerize under UV light, stabilizers, e.g. phosphites or hindered amine light stabilizers (HALS), anti-misting additives and amine synergists.

The permeation-inhibiting release coatings according to the invention may be crosslinked three-dimensionally by free radicals. Under the influence of high-energy radiation, such as UV radiation or electron beams, they cure fully within a very short time to form coats with mechanical and chemical resistance which, given appropriate composition, have predeterminable adhesive properties and also adhesion properties.

Where UV light is used as a radiation source, the crosslinking/curing takes place preferably in the presence of photoinitiators and/or photosensitizers.

Preferred photoinitiators are those of Nonish type 1, e.g. benzoin derivatives, alpha-hydroxyalkylphenones and derivatives, and acylphosphine oxide and derivatives.

Preferred compositions comprise photoinitiators and/or photosensitizers in amounts of 0.01 to 10% by weight, more particularly 0.1 to 5% by weight, based on the overall coating composition.

The photoinitiators and/or photosensitizers are preferably soluble in the compositions, more preferably soluble in the range from 0.01 to 10% by weight, more particularly from 0.1 to 5% by weight, based on the overall composition.

Suitable UV radiation sources for curing the compositions are medium-pressure mercury vapour lamps, optionally doped, or low-pressure mercury vapour lamps, UV-LED lamps, or excimer emitters. The UV emitters may be polychromatic or monochromatic. The emission range of the emitter is preferably situated in the absorption range of the photoinitiators and/or photosensitizers.

The release coatings according to the invention are preferably used as release coating of a self-adhesive thermal paper, particularly a self-adhesive thermal paper which is designed as adhesive tape.

EXAMPLES: COMPONENTS

Component I:
K-I-1: SR 489, tridecyl acrylate, Sartomer, France
K-I-2: Ebecryl® 11, (a polyethylene glycol 600 diacrylate with Mw 700 g/mol), Allnex, Belgium
K-I-3: PETIA, (a mixture of pentaerythritol tri- and tetraacrylate), Allnex, Belgium
K-I-4: Ebecryl® 150, (a bisphenol A derivative diacrylate), Allnex, Belgium
K-I-5: Ebecryl® OTA 480, (a propoxylated glyceryl triacrylate), Allnex, Belgium
K-I-6: Ebecryl® 605 (a mixture of 80% bisphenol A diepoxyacrylate and 20% tripropylene glycol diacrylate), Allnex, Belgium
K-I-7: Laromer® TMPTA, trimethylolpropane triacrylate, BASF, Germany Ebecryl® is a trademark of Cytec Surface Specialties S.A. Anderlecht, Belgium Laromer® is a trademark of BASF Ludwigshafen, Germany Component II:

E-II-1: An exclusively terminally modified silicone with N=50, where N is the number of silicon atoms in the molecule. Prepared by process described in U.S. Pat. No. 6,211,322 via a corresponding hydrogensiloxane by hydrosilylation with trimethylolpropane monoallyl ether and subsequent esterification with acrylic acid, to give 4 acrylate groups per molecule; correspondingly, 4% of the silicon atoms are acrylated.

E-II-2: An exclusively terminally modified silicone with N=100. Prepared as E-II-1; correspondingly 2% of the silicon atoms are acrylated.

E-II-3: An exclusively terminally modified silicone with N=200. Prepared as E-II-1; correspondingly 1% of the silicon atoms are acrylated.

S-II-1: An exclusively laterally modified silicone with N=100. Prepared by process described in U.S. Pat. No. 4,978,726 via a hydrogensiloxane with 6 pendant SiH groups, by hydrosilylation with allyl glycidyl ether and subsequent ring opening with acrylic acid, to give 6 acrylate groups per molecule; correspondingly, 6% of the silicon atoms are acrylated.

S-II-2: A terminally and laterally modified silicone with N=150. Prepared by process described in U.S. Pat. No. 6,211,322 via a hydrogensiloxane having 6 pendant and 2 terminal SiH groups, by hydrosilylation with 5-hexen-1-ol and subsequent esterification with acrylic acid, to give 8 acrylate groups per molecule; correspondingly, 5.3% of the silicon atoms are acrylated.

Component III:

S-III-1: An exclusively laterally modified silicone with N=40. Prepared by process described in U.S. Pat. No. 4,978,726 via a hydrogensiloxane with 6 pendant SiH groups, by hydrosilylation with allyl glycidyl ether and subsequent ring opening with acrylic acid, to give 6 acrylate groups per molecule; correspondingly, 15% of the silicon atoms are acrylated.

S-III-2: An exclusively laterally modified silicone with N=20. Prepared by process described in U.S. Pat. No. 4,978,726 via a hydrogensiloxane with 6 pendant SiH groups, by hydrosilylation with allyl glycidyl ether and subsequent ring opening with a mixture of 15% acetic acid and 85% acrylic acid, to give 5.1 acrylate groups per molecule; correspondingly, 25.5% of the silicon atoms are acrylated.

EXAMPLES: COMPOSITIONS

TABLE 1

Exemplary compositions, content figures in % by weight based on the sum total of components listed

| | Components I | Component II | | Component III | |
|---|---|---|---|---|---|
| Example | | Content [wt %] | | Content [wt %] | | Content [wt %] |
| A | K-I-5 | 5 | E-II-2 | 95 | | 0 |
| B | K-I-5 | 10 | E-II-2 | 90 | | 0 |
| C | K-I-5 | 50 | E-II-2 | 50 | | 0 |
| D | K-I-5 | 90 | E-II-2 | 10 | | 0 |
| E | K-I-5 | 95 | E-II-2 | 5 | | 0 |
| F | K-I-5 | 50 | E-II-1 | 50 | | 0 |
| G | K-I-5 | 50 | E-II-3 | 50 | | 0 |
| H | K-I-5 | 50 | S-II-1 | 50 | | 0 |
| I | K-I-5 | 50 | S-II-2 | 50 | | 0 |
| J | K-I-5 | 20 | E-II-2 | 60 | S-III-1 | 20 |
| K | K-I-5 | 20 | E-II-2 | 60 | S-III-2 | 20 |
| L | K-I-5 | 20 | E-II-2 | 20 | S-III-2 | 60 |

TABLE 1-continued

Exemplary compositions, content figures in % by weight based on the sum total of components listed

| Example | | Components I Content [wt %] | | Component II Content [wt %] | Component III Content [wt %] |
|---|---|---|---|---|---|
| M | K-I-2 | 50 | E-II-2 | 50 | 0 |
| N | K-I-3 | 50 | E-II-2 | 50 | 0 |
| O | K-I-4 | 50 | E-II-2 | 50 | 0 |
| P | K-I-6 | 50 | E-II-2 | 50 | 0 |
| Q | K-I-7 | 50 | E-II-2 | 50 | 0 |
| R | K-I-4 | 20 | E-II-2 | 50 | 0 |
|   | K-I-7 | 30 |        |    |   |
| S | K-I-4 | 20 | E-II-2 | 50 | 0 |
|   | K-I-5 | 30 |        |    |   |
| T | K-I-5 | 25 | E-II-1 | 50 | 0 |
|   | K-I-1 | 25 |        |    |   |
| U |       | 0  | E-II-2 | 70 | S-III-2 30 |
| V |       | 0  | S-II-2 | 70 | S-III-2 30 |
| W |       | 0  | S-II-1 | 100 |   |
| X |       | 0  |        | 0  | S-III-2 100 |

EXAMPLES: PERFORMANCE TESTING

To produce radiation-curing coating compositions, 100 g of each of the compositions were combined with 2% of photoinitiator TEGO® A18 from Evonik Industries AG. The coating compositions were stirred manually with a spatula until there was no longer any visible in homogeneity.

The coating composition was applied to Mitsubishi thermal paper type LL 8077, which has no protection layer on the thermal layer, of 50 cm width, that had previously been subjected to corona pretreatment with a generator output of 1 kW. The application was effected using a 5-roll coating unit from COATEMA® Coating Machinery GmbH, Dormagen, Germany with a weight per unit area of about 1.2 g/m$^2$ and cured by the action of UV light from a medium-pressure mercury vapour lamp from IST® Metz GmbH, Nürtingen, Germany at 60 W/cm and at a lineal speed of 100 m/min under a nitrogen atmosphere with a residual oxygen content of less than 50 ppm.

The coated samples were subjected to a testing of the quality of the release coating, barrier effect and release force.

Quality of the release coating: The coating must cover the entire area and be sealed. This was determined by means of staining the coating with an ink composed of 0.1% methylene blue in water with a contact time of one minute. At the end of the contact time, the ink was drained off and removed completely with a tissue by dabbing. If the coating is provided with defects, the ink penetrates through these defects into the paper fibre and stains the white surface blue. The staining need only be a low marking in order to produce a coating suitable for the test. If the coating is not fully covered, the barrier effect cannot be sufficiently evaluated. The degree of blue staining is evaluated by a trained panel. The evaluation is categorized into grades from 1 to 3, where 3 is inadequate.

Grade 1=very well sealed layer, no blue spots visible.
Grade 2=still acceptable coating, few blue spots observable.
Grade 3=inadequately sealed layer, many blue spots visible.

The investigation of the barrier effect and release effect is carried out only using coatings of quality grade 1.

Baffler effect: By applying 0.5 ml of butyl acetate to the cured release coating, the barrier effect is assessed. For this purpose, the solvent is applied to the surface at 25° C. and a relative air humidity of 40% for an exposure time of 20 seconds and is removed by soaking up with absorbent paper as far as possible without pressure and, after ventilation at room temperature in the hood, the effect on the heat-sensitive layer is assessed alter 30 minutes. If the coating does not have a good barrier effect, butyl acetate penetrates through the coating through into the paper fibre and activates the dye layer, whereby the white paper surface is stained grey to black. For a good barrier effect, the staining must only be a low marking. For the evaluation, an SP62 spectrophotometer from X-Rite, Michigan is used. With the spectrophotometer, L* values prior to treatment with butyl acetate (blank value) and alter treatment with butyl acetate are determined and the difference delta-L* values used for the evaluation. The release coatings according to the invention preferably have delta-L* values of 0 to 20 and are accordingly permeation-inhibiting in the context of the invention.

Release force: The release effect with respect to adhesive materials, in industrial application usually adhesive tapes or labels, is expressed by the release force, with a low release force describing a good release effect. The release force is dependent on the quality of the release coating, on the adhesive and on the test conditions. For evaluation of release coatings, therefore, identical adhesives and test conditions ought to be present. To determine the release forces, the adhesive tape TESA®7475, trademark of tesa SE, Germany, Hamburg was used at a width of 2.5 cm. This test is carried out in accordance with FINAT Handbook, 8th Edition, The Hague/NL, 2009 under designation FTM 10, with the modification that the storage is carried out at 40° C. under pressure.

The results of the barrier effect and the release forces are set out in Table 2. For all examples, release coatings with a quality grade 1 were used.

TABLE 2

Results of the exemplary compositions, stated are the barrier effect (delta-L* values using SP62 spectrophotometer) and release forces (RF) using TESA ®7475 in cN/2.5 cm after storage at 40° C. for 24 hours.

| Example | RF (TESA 7475) [cN/2.5 cm] | Barrier effect (Delta-L*) | Inventive |
|---|---|---|---|
| A | 6 | 32.9 | no |
| B | 8 | 18.21 | yes |
| C | 9 | 5.92 | yes |
| D | 49 | 3.54 | yes |
| E | 160 | 3.12 | no |
| F | 15 | 4.71 | yes |
| G | 6 | 8.95 | yes |
| H | 12 | 8.74 | yes |
| I | 8 | 7.13 | yes |
| J | 9 | 16.41 | yes |
| K | 8 | 14.3 | yes |
| L | 55 | 13.13 | yes |
| M | 10 | 25.31 | no |
| N | 13 | 13.17 | yes |
| O | 17 | 19.23 | yes |
| P | 10 | 9.13 | yes |
| Q | 13 | 9.86 | yes |
| R | 14 | 11.15 | yes |
| S | 12 | 7.31 | yes |
| T | 13 | 35.4 | no |
| U | 6 | 38.3 | no |
| V | 5 | 39.8 | no |
| W | 10 | 34.9 | no |
| X | 255 | 23.53 | no |

It is evident from Table 2 that compositions according to the invention have a good barrier effect against butyl acetate and at the same time a good release effect. Non-inventive compositions have a poor barrier effect with good release effect or even poor results for both properties.

Whereas composition B, C and D have good barrier effect, composition A lacks this property. Although composition E has a good barrier effect, it does not have a good release effect however. Compositions A to E show that a higher proportion of component II has a positive effect on the release behaviour but a negative effect on the barrier effect.

It is further evident that the inventive examples of component II in compositions F, G, H and I all show a good barrier effect with good release behaviour. Compositions J, K and L additionally comprise component III, whereby the barrier effect is not affected or only slightly negatively affected.

It is further evident that the compositions M to Q and R, S, T, which comprise different components I, or mixtures thereof, enable different barrier effect.

For instance, the composition M is without a good barrier effect since the organic acrylate component K-I-2 is highly incompatible with the silicone component II. This incompatibility is caused by the oxyethylene groups in component K-I-2. Mixture M is therefore a significantly biphasic system. Since such components I having oxyethylene groups only mix sparingly in the silicone component II, they enable only an inadequately stronger crosslinking, or none at all, of the weakly crosslinking silicone component II per se. Such mixtures are evidently lacking good barrier effect, such as in example M. These mixtures are therefore non-inventive.

It is further evident that composition T, which comprises a high proportion of component I having only one ethylenically unsaturated free-radically polymerizable group, and is therefore non-inventive, cannot achieve a good barrier effect.

Compositions U, V and W are examples of component II, compositions U and V also comprising component III which do not comprise component I. They all do not show a good barrier effect. This applies also to composition X, which is an example of component III and, besides the poor barrier effect, does not have good release behaviour.

By using the compositions according to the invention, success is achieved in simultaneously obtaining a good barrier effect and a low release force.

The invention claimed is:

1. A permeation-inhibiting release coating obtained by curing a composition comprising components (I), (II) and optionally (III):
(I) 20 to 90% by weight, based on a sum total of components (I), (II) and (III) of the composition, comprises silicon-free hydrocarbons which consist of carbon, hydrogen and oxygen and which have at least one ethylenically unsaturated free-radically polymerizable group and has no oxyethylene groups,
wherein component (I) has a hydrocarbon to an extent of at least 80 and up to 100% by weight, based on a total mass of component (I), having two or more ethylenically unsaturated free-radically polymerizable groups and at least one aromatic group;
(II) 10 to 90% by weight, based on a sum total of components (I), (II) and (III) of the composition, of one or more organomodified silicones having 50 to 500 silicon atoms, wherein 0.4 to 10% of silicon atoms optionally have ethylenically unsaturated free-radically polymerizable groups; and
(III) 0 to 70% by weight, based on a sum total of components (I), (II) and (III) of the composition, of one or more organomodified silicones having 4 to 40 silicon atoms, wherein 15 to 100% of silicon atoms have ethylenically unsaturated free-radically polymerizable groups; and
optionally an additive;
wherein the permeation-inhibiting release coating has a permeation barrier against butyl acetate, and the permeation-inhibiting release coating has a delta-L* value of from 1 to 20.

2. The permeation-inhibiting release coating according claim 1, wherein the delta-L* value is from 1 to 18.

3. The permeation-inhibiting release coating according to claim 1, wherein the permeation-inhibiting release coating has a release force of at most 80 cN/2.5 cm, wherein a lower value of the release force is greater than 1 cN/2.5 cm, and wherein the release force is determined in accordance with FINAT Handbook 8th Edition, The Hague/NI, 2009 under the designation FTM 10.

4. The permeation-inhibiting release coating according to claim 1, wherein the ethylenically unsaturated free-radically polymerizable groups in components (I) and (III) and/or ethylenically unsaturated free-radically polymerizable groups, if present in component (II) are groups selected from an acrylic ester function, a methacrylic ester function or both.

5. The permeation-inhibiting release coating according to claim 1, wherein
component (I) is present at 20 to 70% by weight,
component (II) is present at 30 to 80% by weight, and
component (III) is present at 0 to 40% by weight, all based on the sum total of components (I), (II) and (III) of the composition.

6. The permeation-inhibiting release coating according to claim 1, wherein the component (II) comprises a compound of formula (I):

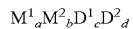  (I)

wherein $M^1=[R^1_3SiO_{1/2}]$,
$M^2=[R^1_2R^2SiO_{1/2}]$,
$D^2=[R^1_2SiO_{2/2}]$,
$D^2=[R^1R^2SiO_{2/2}]$,
a=0 to 2,
b=0 to 2, and a+b=2,
c=50 to 490,
d=0 to 15, and
a ratio of the sum (b+d) to the sum (c+d+2) is from 0.004 up to 0.1,
the sum (c+d+2) is 50 to 500,
$R^1$ denotes identical or different aliphatic hydrocarbons having 1 to 10 carbon atoms or aromatic hydrocarbons having 6 to 12 carbon atoms, and
$R^2$ denotes identical or different hydrocarbons which have 1 to 5 identical or different ester functions, and the hydrocarbon is linear, cyclic, branched and/or aromatic.

7. The permeation-inhibiting release coating according to claim 1, wherein the component (III) comprises a compound of formula (II):

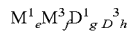  (II)

wherein
$M^1=[R^1_3SiO_{1/2}]$,
$M^3=[R^1_2R^3SiO_{1/2}]$,
$D^1=[R^1_2SiO_{2/2}]$,
$D^3=[R^1R^3SiO_{2/2}]$,
e=0 to 2,
f=0 to 2, and e+f=2,
g=0 to 38, h=0 to 20 and a ratio of the sum (f+h) to the sum (g+h+2) is from 0.15 up to 1, the sum (g+h+2) is from 4 to 40, $R^1$ denotes identical or different aliphatic hydrocarbons having 1 to 10 carbon atoms or aromatic hydrocarbons having 6 to 12 carbon atoms, and $R^3$ denotes identical or different hydrocarbons which have 1 to 5 identical or different ester functions, and the hydrocarbon is linear, cyclic, branched and/or aromatic.

8. The permeation-inhibiting release coating according to claim 1, wherein component (III) comprises ester groups that are not free-radically polymerizable.

9. The permeation-inhibiting release coating according to claim 1, wherein ester groups that are not free-radically polymerizable are not present in component (II) and ester groups that are not free-radically polymerizable are present in component (III) in a numerical proportion of 5 to 15%, based on the number of all ester functions in component (III).

10. A method for preparing the permeation-inhibiting release coating according to claim 1, the method comprising:

radiation-curing the permeation-inhibiting release coating.

11. A topcoat for thermal papers, comprising:

a permeation-inhibiting release coating obtained by curing a composition comprising components (I), (II) and optionally (III):

(I) 20 to 90% by weight, based on a sum total of components (I), (II) and (III) of the composition, comprises silicon-free hydrocarbons which consist of carbon, hydrogen and oxygen and which have at least one ethylenically unsaturated free-radically polymerizable group and have no oxyethylene groups, wherein component (I) has a hydrocarbon to an extent of at least 80 and up to 100% by weight, based on a total mass of component (I), having two or more ethylenically unsaturated free-radically polymerizable groups and at least one aromatic group;

(II) 10 to 90% by weight, based on a sum total of components (I), (II) and (III) of the composition, of one or more organomodified silicones having 50 to 500 silicon atoms; and (III) 0 to 70% by weight, based on a sum total of components (I), (II) and (III) of the composition, of one or more organomodified silicones having 4 to 40 silicon atoms, wherein 15 to 100% of silicon atoms have ethylenically unsaturated free-radically polymerizable groups; and optionally an additive;

wherein the permeation-inhibiting release coating has a permeation barrier against butyl acetate, and the permeation-inhibiting release coating has a delta-L* value of from 1 to 20.

12. The topcoat according to claim 11, wherein the thermal paper is self-adhesive and is designed as adhesive tape.

13. A radiation-curing coating composition for preparing a permeation-inhibiting release coating having a permeation barrier against butyl acetate, the permeation-inhibiting release coating comprising components (I), (II) and optionally (III):

(I) 20 to 90% by weight, based on a sum total of components (I), (II) and (III) of the composition, comprises silicon-free hydrocarbons which consist of carbon, hydrogen and oxygen and which have at least one ethylenically unsaturated free-radically polymerizable group and have no oxyethylene groups, wherein component (I) has a hydrocarbon to an extent of at least 80 and up to 100% by weight, based on a total mass of component (I), having two or more ethylenically unsaturated free-radically polymerizable groups and at least one aromatic group;

(II) 10 to 90% by weight, based on a sum total of components (I), (II) and (III) of the composition, of one or more organomodified silicones having 50 to 500 silicon atoms; and (III) 0 to 70% by weight, based on a sum total of components (I), (II) and (III) of the composition, of one or more organomodified silicones having 4 to 40 silicon atoms, wherein 15 to 100% of the silicon atoms have ethylenically unsaturated free-radically polymerizable groups; and an additive, wherein the permeation-inhibiting release coating has a delta-L* value of from 1 to 20.

14. The radiation-curing coating composition according to claim 13, wherein the additive is at least one selected from the group consisting of a photoinitiator, a photosensitizer, a filler, a pigment, a solvent, a phosphorus-containing compound which polymerizes under UV light, a stabilizer, an anti-misting additive and an amine synergist.

* * * * *

UNITED STATES PATENT AND TRADEMARK OFFICE
CERTIFICATE OF CORRECTION

PATENT NO. : 11,001,737 B2
APPLICATION NO. : 16/312330
DATED : May 11, 2021
INVENTOR(S) : Pomorin et al.

It is certified that error appears in the above-identified patent and that said Letters Patent is hereby corrected as shown below:

In the Specification

In Column 2, Line 4, delete "packagings" and insert -- packaging --.

In Column 5, Line 45, delete "alter" and insert -- after --.

In Column 8, Line 14, delete "$M^1=[R^1_3SiO_{12}]$," and insert -- $M^1=[R^1_3SiO_{1/2}]$, --.

In Column 9, Line 23, delete "Nonish" and insert -- Norrish --.

In Column 11, Line 64, delete "Baffler" and insert -- Barrier --.

In Column 12, Line 4, delete "alter" and insert -- after --;

In Column 12, Line 12, delete "alter" and insert -- after --.

In the Claims

In Column 14, Claim 2, Line 10, insert -- to -- after "according";

In Column 14, Claim 6, Line 39, delete "$D^2=[R^1_2SiO_{2/2}]$," and insert -- $D^1=[R^1_2SiO_{2/2}]$, --;

In Column 14, Claim 6, Line 41, delete "a=0to" and insert -- a=0 to --;

In Column 14, Claim 6, Line 42, delete "b=0to" and insert -- b=0 to --.

In Column 15, Claim 7, Line 1, delete "20" and insert -- 20, --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*